United States Patent
Hirai

(10) Patent No.: US 7,609,914 B2
(45) Date of Patent: Oct. 27, 2009

(54) IMAGE PROCESSING APPARATUS AND ITS METHOD

(75) Inventor: Tatsuhiko Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 11/363,031

(22) Filed: Feb. 28, 2006

(65) Prior Publication Data

US 2006/0197928 A1    Sep. 7, 2006

(30) Foreign Application Priority Data

Mar. 1, 2005    (JP)    ............... 2005-056214

(51) Int. Cl.
*G06K 9/54* (2006.01)
*G06F 7/00* (2006.01)

(52) U.S. Cl. .................. 382/305; 707/104.1

(58) Field of Classification Search ................ 382/162, 382/173, 305, 312, 115–119; 707/10, 104.1; 358/1.9; 713/187, 193, 200, 201; 717/174; 386/46; 705/51, 57, 80

See application file for complete search history.

(56) References Cited

U.S. PATENT DOCUMENTS

| | | | |
|---|---|---|---|
| 5,710,920 A | * | 1/1998 | Maruyama et al. ...... 707/103 R |
| 5,787,437 A | * | 7/1998 | Potterveld et al. ....... 707/103 R |
| 6,728,713 B1 | * | 4/2004 | Beach et al. ................... 707/10 |
| 7,099,932 B1 | * | 8/2006 | Frenkel et al. ............... 709/223 |
| 2006/0095439 A1 | * | 5/2006 | Buchmann et al. .......... 707/100 |

FOREIGN PATENT DOCUMENTS

JP    2004-118243    4/2004

* cited by examiner

*Primary Examiner*—Kanji Patel
(74) *Attorney, Agent, or Firm*—Fitzpatrick, Cella, Harper & Scinto

(57) ABSTRACT

When a history including printed information, a date, a user, and the like is stored, a search for stored information is allowed, and the history can be referred to if information has leaked, a large-capacity storage device is required to store all images in the storage device. Hence, user authorization is made. If user authorization has succeeded, image data is acquired, and is segmented into regions of respective attributes by block selection. Next, objects of respective segments are converted into vector data. It is searched if an object that matches each of the objects is stored in an image storage server. If a matching object is detected, an object ID added to that object is acquired. If no matching object is detected, an object ID of the object of interest is generated, and vector data added with the object ID is registered in the image storage server.

10 Claims, 10 Drawing Sheets

FIG. 4
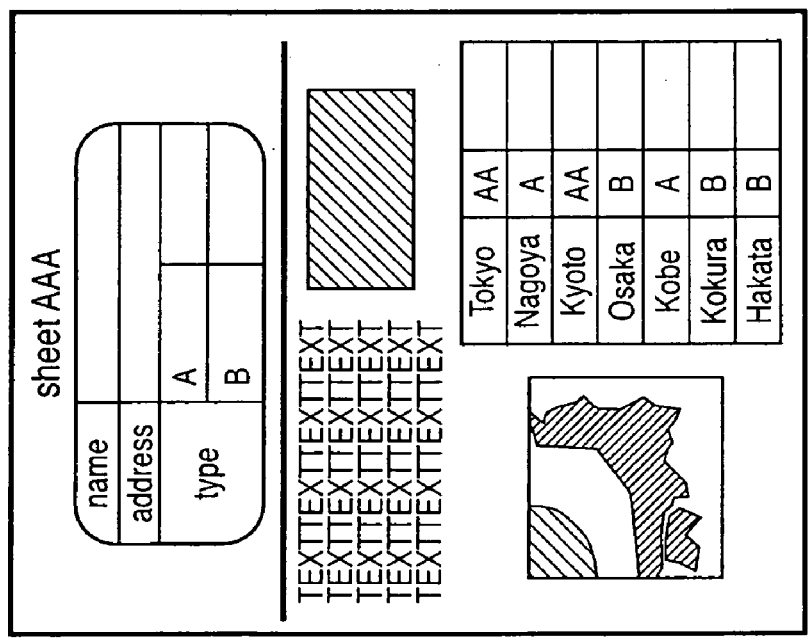
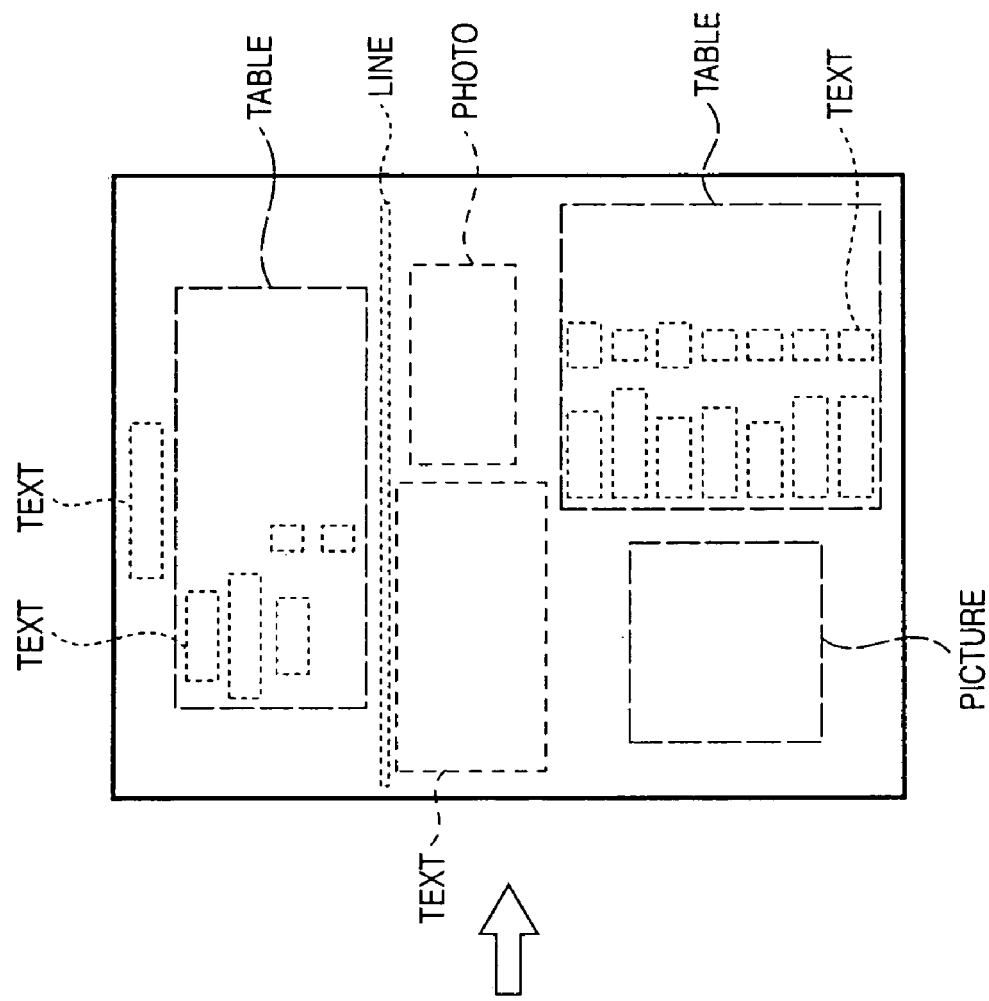

FIG. 5A

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | ABSENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 5 | X6 | Y6 | W6 | H6 | ABSENT |

*ATTRIBUTE 1:TEXT 2:PICTURE 3:TABLE 4:LINE 5:PHOTO

FIG. 5B

INPUT FILE INFORMATION

| TOTAL NUMBER OF BLOCKS | N(=6) |
|---|---|

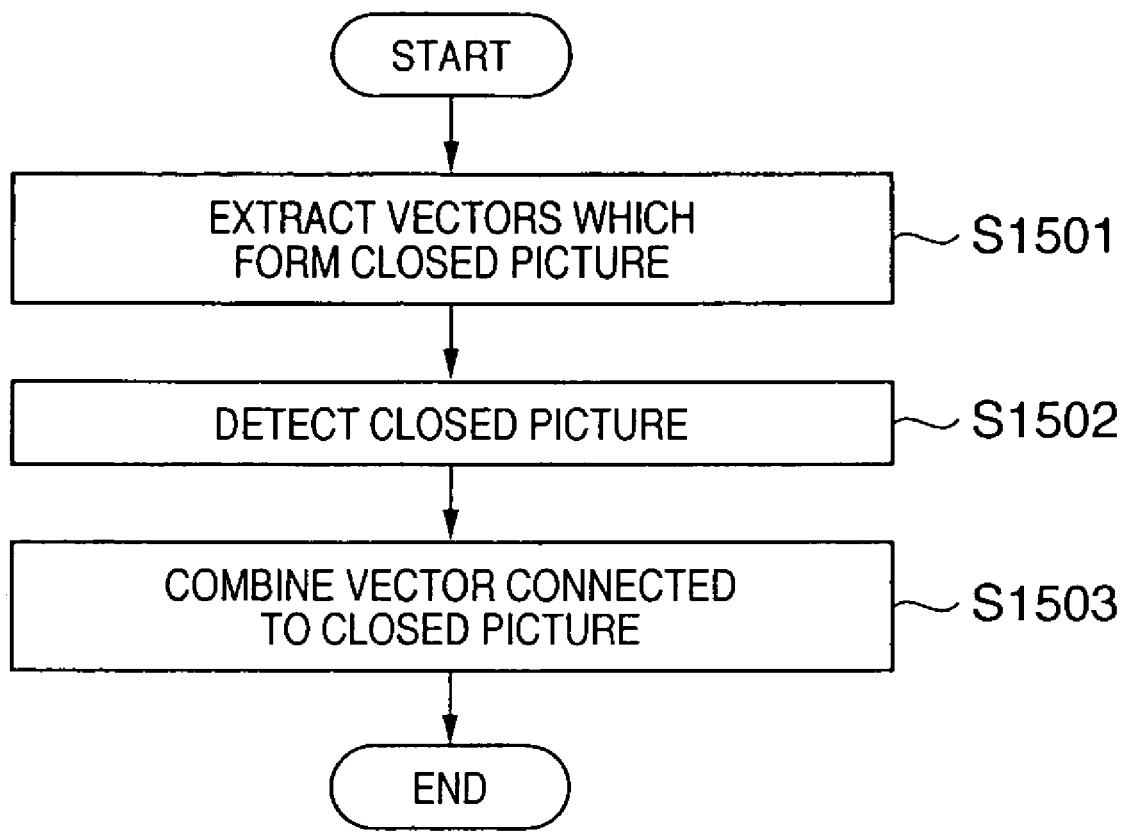

IMAGE PROCESSING APPARATUS AND ITS METHOD

FIELD OF THE INVENTION

The present invention relates to an image processing apparatus and its method and, more particularly, to image processing which performs history management of images and jobs.

BACKGROUND OF THE INVENTION

Along with the prevalence of image processing apparatuses, everyone can easily copy and transmit document images. However, although such easy copying and transmission improve the user's convenience, they also pose a problem of leakage of information such as copying and transmission of secret information. To solve this problem, an image processing apparatus which stores all read image data in a recording device upon copying or transmission is available. With such apparatus, the administrator can track down a leakage source by checking the image processing apparatus which read a document image of information leaked.

Japanese Patent Laid-Open No. 2004-118243 describes an apparatus which stores a history including information printed by a printer, a printing date and time, a user who made printing, and the like, and allows to search for stored information. This reference discloses an apparatus which has a deterrence over illicit information leakage, since the history can be referred to if perchance information has leaked.

However, in order to store all input and output image data in the recording device, a large-capacity recording device is required. In addition, image data in which some characters or images have been changed by editing a previously copied document image is stored as an image different from the previously copied document image. In other words, the storage efficiency is very poor.

SUMMARY OF THE INVENTION

The first aspect of the present invention discloses an image processing apparatus for receiving an image and executing a job for the image, comprising:

a segmenting section, arranged to segment the input image into image regions having different attributes; a first detector, arranged to detect a corresponding image from a first memory by search for an image of each of the segmented image regions, and to acquire, when the corresponding image is detected, an object ID of the detected image; a storing section, arranged to store the image of the image region, the corresponding image of which is not detected, in the first memory by adding a unique object ID to the image; a generator, arranged to generate schema information which includes location information of the image regions and the object IDs of the images of the image regions, and indicates a layout of the input image; and a registering section, arranged to register history information including at least the schema information in a second memory.

According to the present invention, when images and jobs are to undergo history management, objects can be prevented from being redundantly registered.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows a display example of an operation window;

FIGS. 5A and 5B show an example of the block selection result;

FIG. 10 is a flowchart showing detection processing of picture elements.

DETAILED DESCRIPTION OF THE PREFERRED EMBODIMENTS

Image processing according to preferred embodiments of the present invention will be described in detail hereinafter with reference to the accompanying drawings.

First Embodiment

[Image Processing System]

Figure 1:
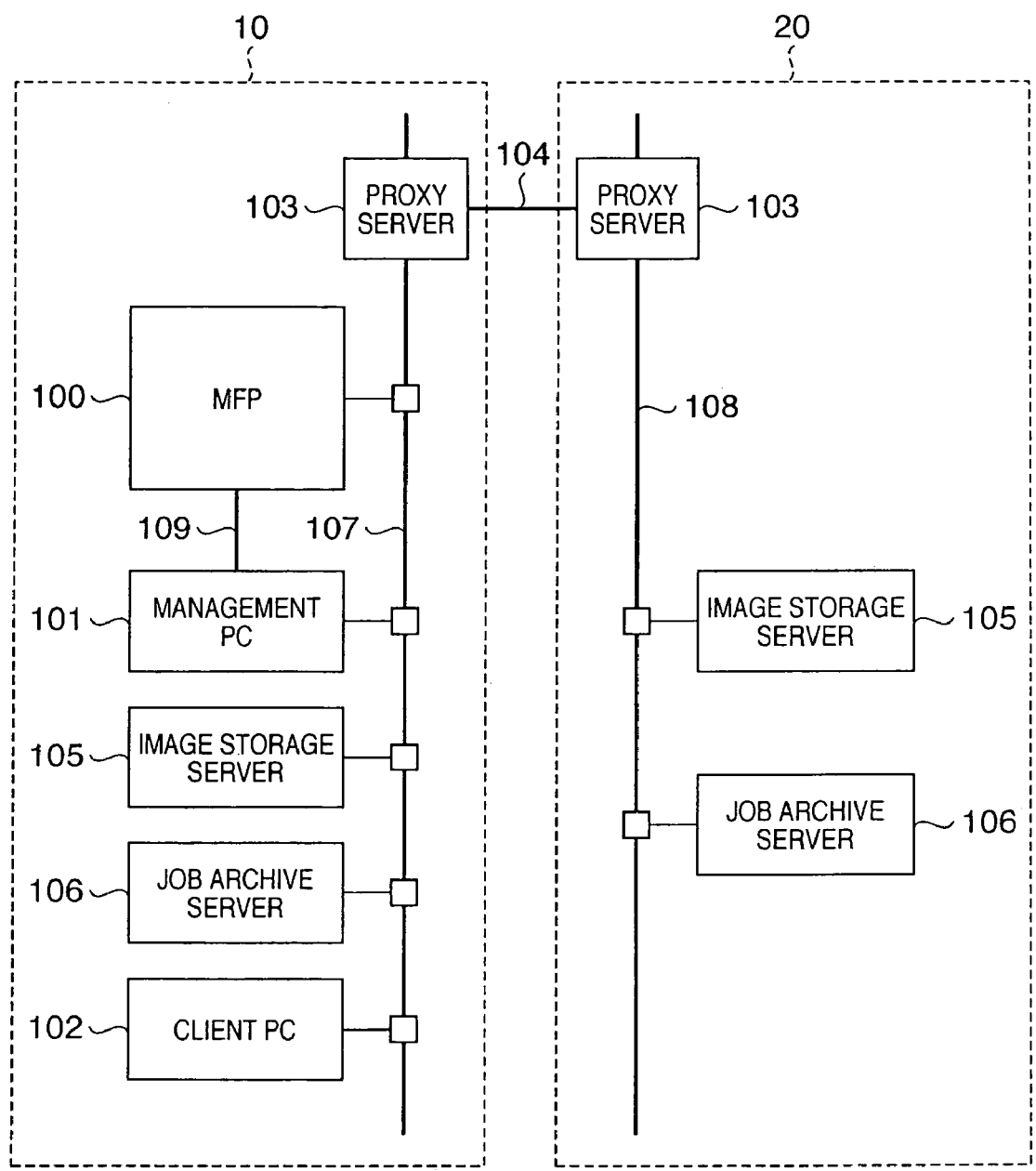
FIG. 1 is a block diagram showing the arrangement of an image processing system which digitizes information using an MFP.

FIG. 1 is a block diagram showing the arrangement of an image processing system which digitizes information using a multi-functional peripheral equipment (MFP) as a recording apparatus whose functions are expanded.

This image processing system is implemented in an environment in which offices (or a plurality of office-like partitions) 10 and 20 are connected via a wide area network (WAN) 104 such as the Internet or the like.

To a local area network (LAN) 107 formed in the office 10, an MFP 100 is connected. In addition, a management PC 101 which controls the MFP 100, a client PC 102, an image storage server 105 which stores an image, a job archive server 106 which stores history information of an image, and the like are connected to the LAN 107. The office 20 has almost the same arrangement as the office 10 except that, to a LAN 108 formed in the office 20, at least another image storage server 105, job archive server 106, and the like are connected. The LANs 107 and 108 of the offices 10 and 20 are connected to each other via a proxy server 103 connected to the LAN 107, the WAN 104, and another proxy server 103 connected to the LAN 108.

The MFP 100 does some of image processes for reading a document image, and processing a read image. An image signal output from the MFP 100 is input to the management PC 101 via a communication line 109. The management PC 101 comprises a normal personal computer (PC). The management PC 101 has a memory such as a hard disk or the like for storing images, an image processor implemented by hardware or software, a monitor such as a CRT, LCD, or the like, and an input unit including a mouse, keyboard, and the like. Some components of the management PC 101 are integrally formed with the MFP 100. Note that a case will be exemplified hereinafter wherein the management PC 101 executes processing and the like to be described later, but the MFP 100 may execute the processing to be executed by the management PC 101.

The management PC 101 segments image data read by the MFP 100 into a text region and image region by block selection (BS), assigns unique object IDs to respective regions, and stores them in the image storage server 105. Also, the management PC 101 sets, as a job history, schema information including an object ID and layout information of an image printed or transmitted by the MFP 100, and attribute information such as a date and time, user ID, job type, and the like. The management PC 101 records the job history in the job archive server 106.

The client PC 102 can supply an image to the MFP 100 (or management PC 101) and can control it to print or transmit the image. The client PC 102 can download images and schema information stored in the image storage server 105 and job archive server 106 and can display images.

[MFP]

Figure 2:
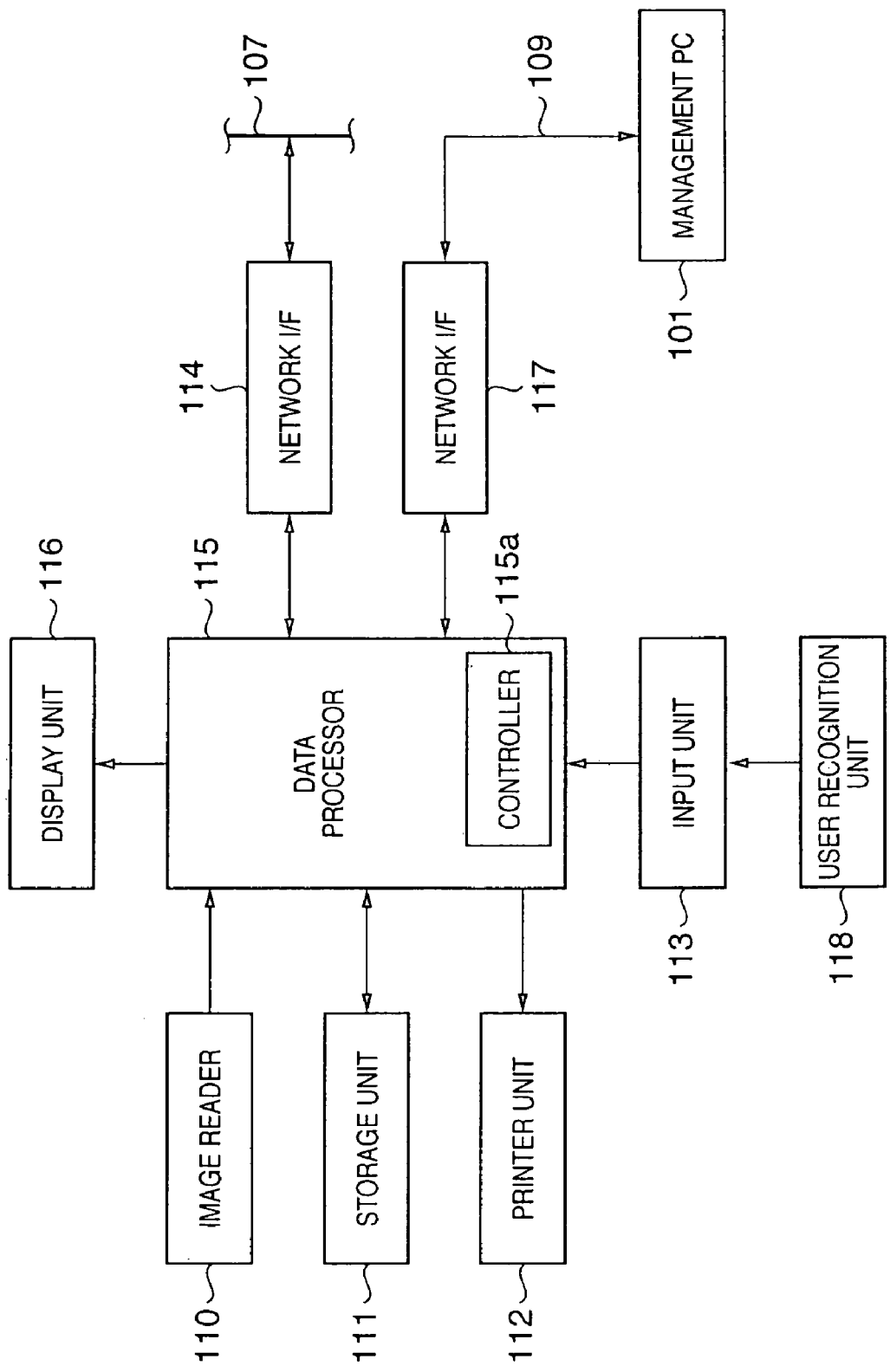
FIG. 2 is a block diagram showing the arrangement of the MFP.

FIG. 2 is a block diagram showing the arrangement of the MFP 100.

An image reader 110 including an auto document feeder (ADF) irradiates an image on each of one or a plurality of stacked documents with light coming from a light source, and forms an image of light reflected by the document on a solid-state image sensing element via a lens. Then, the image reader 110 obtains a read image signal (e.g., 600 dpi, 8 bits) in the raster order from the solid-state image sensing element. When a document is to be copied, a data processor 115 converts this read image signal into a print signal. When an image is copied on a plurality of print sheets, the data processor 115 temporarily stores a print signal for one page in a storage unit 111, and repetitively outputs the print signal to a printer unit 112, thus forming images on the plurality of print sheets.

On the other hand, print data output from the client PC 102 is input to a network interface (I/F) 114 via the LAN 107. The print data is converted into printable raster data by the data processor 115, and is formed by the printer unit 112 as an image on a print sheet.

An input unit 113 which includes a key operation unit equipped on the MFP 100 and a keyboard and mouse of the management PC 101 is used to input operator's instruction to the MFP 100. A display unit 116 displays operation inputs, image processing states, and the like.

The operation of the MFP 100 is controlled by a controller 115*a* which is included in the data processor 115 and comprises, e.g. a one-chip microcontroller.

Note that the storage unit 111 can also be controlled from the management PC 101. Data exchange and control between the MFP 100 and management PC 101 are made via a network I/F 117 and the signal line 109 which directly connects them.

Note that the MFP 100 may comprise an interface which acquires image data from an image sensing apparatus such as a digital camera, digital video, or the like, a portable terminal such as a portable data assistant (PDA), a facsimile, or the like as a part of the input unit 113.

A user recognition unit 118 used to identify the user is connected to the input unit 113. The user recognition unit 118 is, e.g., an IC card reader, keys used to input an ID or password, a biometric device that identifies biometric information such as fingerprints, a handprint, a capillary pattern, an iris, or the like. The user recognition unit 118 inputs information that specifies the user who uses the MFP 100 (to be referred to as "user specifying information" hereinafter), and outputs the user specifying information to the data processor 115 via the input unit 113.

Also, information indicating the security level of each user of the MFP 100 is set and stored in a nonvolatile memory of the data processor 115 or that of the management PC 101 (e.g., a hard disk). Therefore, the data processor 115 can acquire the security level corresponding to the user specifying information input from the user recognition unit 118. When an IC card reader is used as the user recognition unit 118, the user recognition unit 118 may notify the data processor 115 of the security level stored in a memory in an IC card.

In the following description, an event that the data processor 115 acquires the security level corresponding to the user specifying information acquired by the user recognition unit 118 (or it directly acquires the security level from the user recognition unit 118) will be referred to as "user authorization".

[Flow of Processing]

Figure 3:
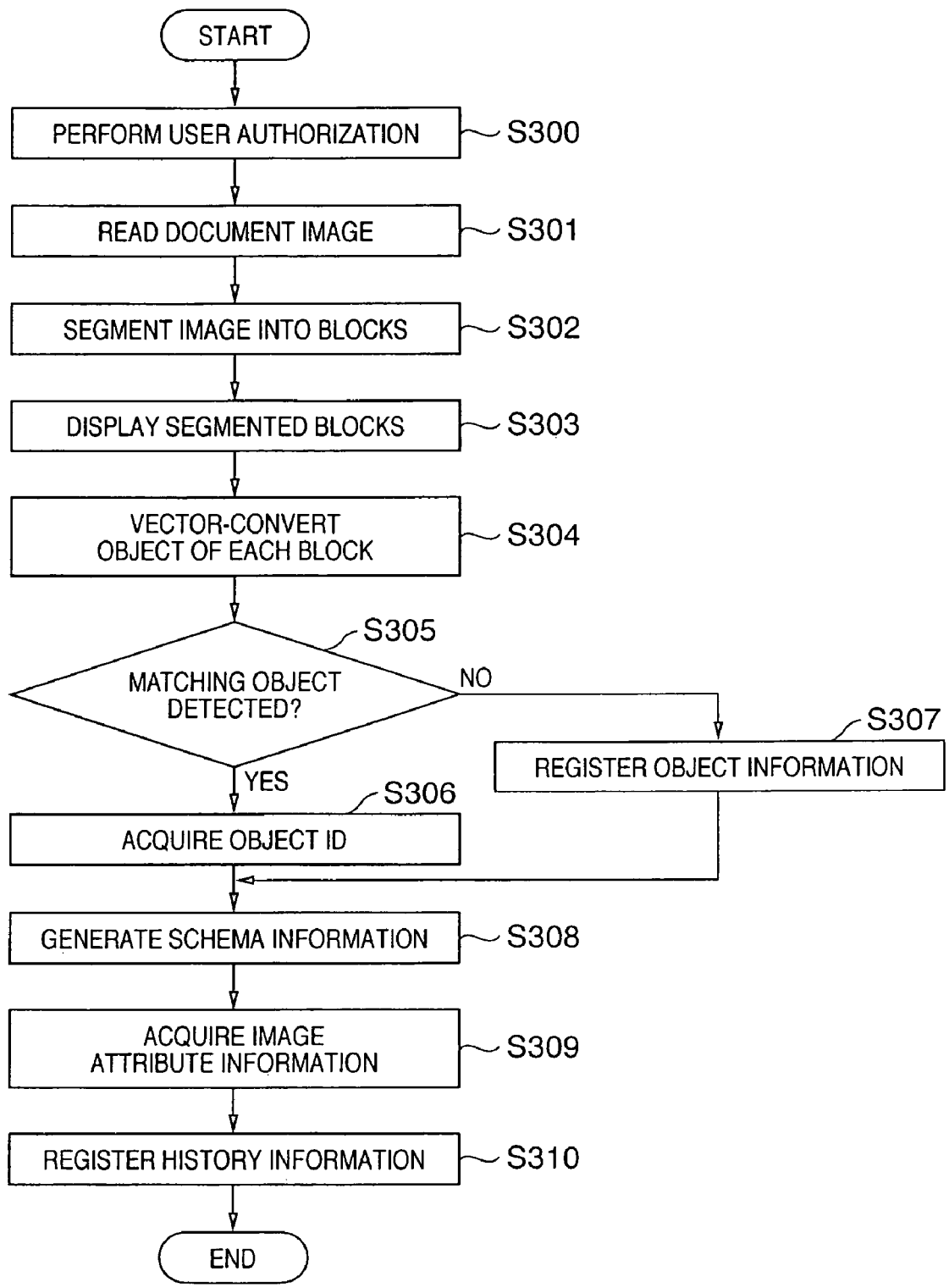
FIG. 3 is a flowchart for explaining an overview of processing by the image processing system.

FIG. 3 is a flowchart for explaining the flow of the processing by the aforementioned image processing system. This processing is executed by the management PC 101 or data processor 115 or a combination of them.

The MFP 100 performs user authorization (S300). If user authorization has failed, the MFP 100 displays a message that advises accordingly on the display unit 116, and does not accept any operation. If user authorization has succeeded, the MFP 100 enables the image reader 110 to scan a document image for one page in a raster order, thus acquiring a read image signal. The read image signal is pre-processed by the data processor 115, and is saved in the storage unit 111 as image data for one page of the input image (S301).

When a job instruction is input from the client PC 102, the management PC 101 sends an authorization request to the client PC 102, and performs user authorization based on user specifying information input in response to that request (S300). If user authorization has failed, the management PC 101 returns a message that advises accordingly to the client PC 102 and does not accept any job. If user authorization has succeeded, the management PC 101 controls the data processor 115. Then, the management PC 101 makes the data processor 115 receive and pre-process image data transmitted from the client PC 102, and save the image data as that for one page of an input image in the storage unit 111 (S301).

The image data stored in the storage unit 111 undergoes a process (copying, printing, data transmission, or facsimile transmission) in accordance with an instruction content of the job by the MFP 100, independently of the process to be described below.

Next, the management PC 101 executes block selection (BS) processing to segment the image data stored in the storage unit 111 into a text and line region including character or line images, a halftone photo region, an image region with an indeterminate form, and other regions. Furthermore the text and line region is segmented into a text region mainly including characters and a line region mainly including a table, picture, or the like, and the line region is segmented into a table region and figure region (S302). Note that the first embodiment detects connected pixels, and segments image data into regions of respective attributes using the shapes, sizes, pixel densities, and the like of circumscribed rectangular regions of the connected pixels. However, other region segmentation methods may be used.

The text region is segmented into rectangular blocks (text region rectangular blocks) to have clusters such as paragraphs and the like as blocks. The line region is segmented into rectangular blocks of individual objects (table region rectangular block, line region rectangular block) such as a table, picture, and the like. The photo region expressed by halftone is segmented into rectangular blocks such as an image region rectangular block, background region rectangular block, and the like. Note that information of these rectangular blocks will be referred to as "block segmentation information" hereinafter.

The data processor 115 combines the block segmentation information obtained by the BS processing and the input image and displays them on an operation window of the display unit 116 (S303), as exemplified in FIG. 4. The input image itself is displayed on the left side of the operation window, and the block segmentation information is displayed as rectangular blocks on the right side. Note that FIG. 4 shows character strings TEXT, PICTURE, LINE, TABLE, and the like indicating their attributes in correspondence with respective blocks so as to allow easy understanding of rectangular blocks. However, such attribute information is not displayed on the actual operation window, and the rectangular blocks are displayed as frame borders. The attribute information TEXT indicates a text attribute; PICTURE, a picture attribute; PHOTO, a photo attribute; LINE, a line attribute; and TABLE, a table attribute. Of course, in addition to side-by-side display of the input image and block segmentation information shown in FIG. 4, they may be overlaid on each other so that the rectangular blocks are displayed on the input image. Hence, various other display modes are available.

Next, the management PC 101 executes vector conversion processing to convert objects of respective segments into vector data (S304). Note that an object of a photo attribute (image data) is not vector-converted. The management PC 101 then searches if each of the objects matches those (vector data or image data) stored in the image storage server 105 (S305). Note that the image storage server 105 stores objects together with unique object IDs.

Each object is searched for in accordance with attributes such as text, photo, table, line, and the like. When a query object is a text object, character codes are determined by optical character recognition (OCR) processing, and a character string can be searched for. When a query object is a picture, table, or line object, layout information is generated from information such as the positional relationship, layout, or the like of rectangles, special picture, a table (ruled lines) based on vector data generated by the vector conversion processing, and a so-called layout search is conducted. When a query object is a photo object, the ratio of similarity is calculated from an error on a feature space based on a feature vector extracted from an image, thus searching for objects with higher ratios of similarity. There are a plurality of feature vectors such as feature amounts associated with colors such as a color histogram, color moment, and the like, texture feature amounts expressed by a co-occurrence matrix, contrast, entropy, Gabor's wavelet transformation, and the like, shape feature amounts such as a Fourier descriptor and the like, and so forth. Of these plurality of feature amounts, an optimal combination may be used.

If a matching object is detected by the search, the management PC 101 acquires an object ID added to that object (S306). If no matching object is detected by the search, the management PC 101 generates an object ID of that object, and registers vector data (or image data) added with the object ID in the image storage server 105 (S307). Note that the object ID must be unique, and may be normally generated from a registration date and time.

Although FIG. 3 shows a simplified flow, the management PC 101 repetitively executes the processes in steps S305 to S307 for objects of all segments of the read document image.

In this way, the management PC 101 acquires or generates the object IDs for the objects of all the segments of the read document image. Upon completion of acquisition and generation of the object IDs, schema information which defines location information of the objects of the document image and layout information including the object IDs acquired or generated in steps S306 and S307 by, e.g., a schema or the like is generated (S308).

Next, the management PC 101 acquires job attribute information (S309). The job attribute information includes:
information indicating an execution date and time of a job;
authorization information (user name or user code);
an image name (file name or the like);
address information (IP or MAC address) of the client PC 102;
information indicating a job type (facsimile transmission, data transmission, print, copy, or the like);
the product number of the MFP 100, and so forth.

Note that the image name, address information, and the like, which are not always be acquired may be empty.

The management PC 101 registers the schema information and job attribute information in the job archive server 106 as history information (S310). The client PC 102 can download images and schema information stored in the image storage server 105 and job archive server 106 and can display images. That is, by searching for the image storage server 105 using the schema information and object IDs included in the schema information, images obtained by rasterizing the documents can be reconstructed.

Therefore, if printed matter or data with an inappropriately high confidentiality is found, job attribute information which has already been registered in the job archive server 106 is searched for using this printed matter or data, thus detecting when and who processed that printed matter or data with the high confidentiality. In this search, the user of the client PC 102 visually compares the printed matter or data with the high confidentiality with displayed images reconstructed from those in the image storage server 105, so as to specify an image corresponding to the printed matter or data with the high confidentiality from those in the image storage server 105. After that, in accordance with an instruction from the client PC 102, the job archive server 106 is searched for job attribute information corresponding to the specified image. Alternatively, the client PC 102 may determine similarities between data obtained by applying the scan and BS processing by the MFP 100 to this printed matter with the high confidentiality with images stored in the image storage server 105. Then, the client PC 102 may search the job archive server 106 for job attribute information corresponding to images with higher similarities.

The processes of principal steps shown in FIG. 3 will be described in detail below.

[Block Selection (S302)]

Block selection is processing for recognizing the image for one page shown in FIG. 4 as a set of objects, determining attributes of the respective objects as TEXT, PICTURE, PHOTO, LINE, and TABLE, and segmenting them into segments (blocks) having different attributes. A practical example of block selection will be described below.

An image to be processed is binarized to a monochrome image, and a cluster of pixels bounded by black pixels is extracted by outline tracing. For a cluster of black pixels with a predetermined area or more, outline tracing is also made for white pixels in the cluster to extract clusters of white pixels. Furthermore, extraction of clusters of black and white pixels is recursively repeated so that a cluster of black pixels is extracted from the cluster of white pixels with a predetermined area or more.

Rectangular blocks which circumscribe the pixel clusters obtained in this way are generated, and their attributes are determined based on the sizes and shapes of the rectangular blocks. For example, a pixel cluster which has an aspect ratio close to 1, and has a size that falls within a predetermined range is determined as that of a text attribute. Furthermore, when neighboring pixel clusters of the text attribute regularly line up and can be grouped, they are determined as a text region. Also, a low-profile pixel cluster with a small aspect ratio is categorized as a line block. In addition, a range occupied by black pixel clusters that include rectangular white pixel clusters which have a predetermined size or more and a size close to a rectangle and regularly line up is categorized as a table region. Furthermore, a region where pixel clusters with indeterminate forms are distributed is categorized as a photo region. Other pixel clusters with an arbitrary shape are categorized as a figure region.

FIGS. 5A and 5B show an example of the block selection result. FIG. 5A shows block information of each extracted rectangular block. The block information includes an attribute, coordinates X and Y of a position, width W, height H, OCR information, and the like of each block. Attributes are given as numerical values 1 to 5: "1" indicates a text attribute; "2", a picture attribute; "3", a table attribute; "4", a line attribute; and "5", a photo attribute. The coordinates X and Y indicate the X- and Y-coordinates (those of the upper left corner) of a start point of each rectangular block of the input image, the width W and height H indicate the width in the X-coordinate direction and the height in the Y-coordinate direction of the rectangular block, and the OCR information indicates the presence/absence of it.

FIG. 5B shows input file information, which indicates the total number of rectangular blocks extracted by block selection.

The block information for each rectangular block is used in vector conversion of the designated block. Based on the block information, the relative positional relationship between the vector-converted designated block and raster data can be specified, and the vector-converted block and raster data blocks can be combined without damaging the layout of the input image.

[Vector Conversion (S304)]

As the vector conversion, the following schemes are available.

(a) In case of a segment of the text attribute, a character pattern is converted into a character code by OCR processing, or is converted into visually faithful font data by recognizing the size, style, and face of a character.

(b) In case of a segment of the line or text attribute which cannot undergo character recognition by the OCR processing, an outline of a line image or character is traced, and outline information is converted into a format that expresses the line image or character as connection of line segments.

(c) In case of a segment of the picture attribute, an outline of a picture object is traced, and outline information is converted into a format that expresses outline information as connection of line segments.

(d) The outline information of a line segment format obtained by the scheme (b) or (c) undergoes fitting by a Bezier function to be converted into function information.

(e) The shape of the picture is recognized based on the outline information of the picture object obtained by the scheme (c), and is converted into figure definition information such as a circle, rectangle, polygon, or the like.

(f) In case of a segment of the table attribute, ruled lines and frame borders are recognized, and are converted into form information of a predetermined format.

In addition to the aforementioned schemes, various kinds of vector conversion processing which replace image data by command definition type information such as code information, picture information, function information, and the like are available.

[Vector Conversion of Text Region]

Figure 6:
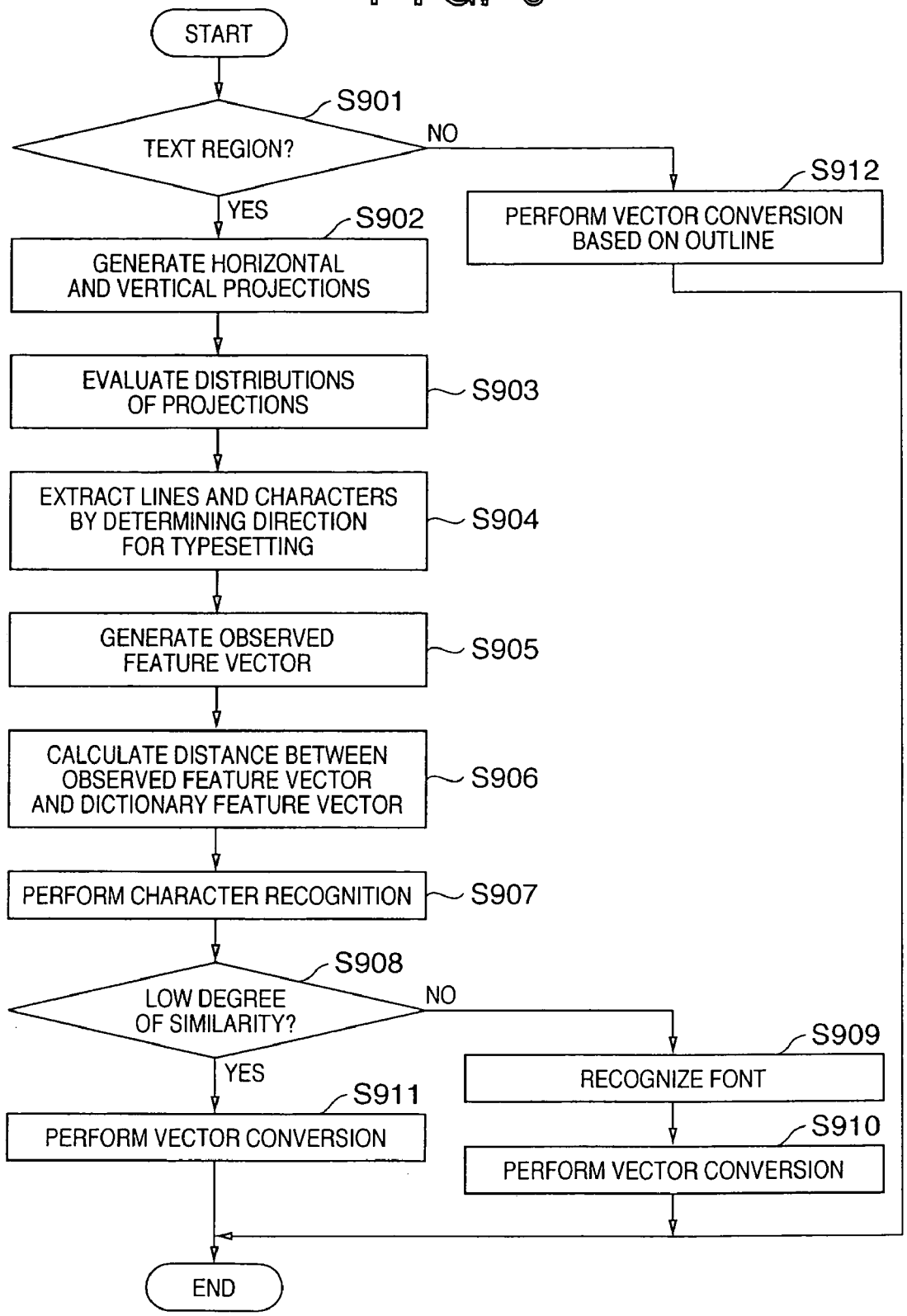
FIG. 6 is a flowchart showing details of vector conversion processing.

FIG. 6 is a flowchart showing details of vector conversion processing (S304), which is the processing executed by the data processor 115 (or management PC 101).

It is checked with reference to block information if a segment of interest is that of the text attribute (S901). If the segment of interest is that of the text attribute, the flow advances to step S902 to make character recognition using an arbitrary pattern matching scheme, thus obtaining a corresponding character code.

If the segment of interest is other than that of the text attribute, vector conversion based on the outline of the image is executed (S912), as will be described in detail later.

In case of the segment of the text attribute, horizontal and vertical projections of pixel values are calculated to determine horizontal or vertical writing (to determine the direction for typesetting) (S902). The distributions of the projections are evaluated (S903). If the distribution of the horizontal projection is larger, horizontal writing is determined; if that of the vertical projection is larger, vertical writing is determined. Based on this determination result, lines are segmented, and characters are then segmented, thus obtaining character images (S904).

Upon decomposition into a character string and characters, in case of horizontal writing, lines are segmented using the horizontal projection, and characters are segmented based on the vertical projection with respect to the segmented lines. For a vertical writing text region, columns are segmented using the horizontal projection, and characters from the vertical projection with respect to the segmented columns. Note that each character size can also be detected upon segmenting lines and characters.

Next, for each segmented character, an observed feature vector obtained by converting the feature obtained from a character image into a several-ten-dimensional numerical value string is generated (S905). Feature vector extraction may use various known methods. For example, the following method may be used. That is, a character is segmented into meshes, lines which form the character in the meshes are counted as direction-dependent line elements, and a vector having dimensions as many as the number of meshes is defined as a feature vector.

The observed feature vector is compared with feature vectors which are calculated for respective character types and are stored in a feature dictionary to calculate distances between these vectors (S906). The calculated distances are evaluated, and a character type with a smallest distance is determined as a recognition result (S907). Based on the evaluation results of the distances, the smallest distance is compared with a threshold. If the smallest distance is less than the threshold, it is determined that the similarity is high; otherwise, it is determined that the similarity is low (S908). If the smallest distance is equal to or larger than the threshold (if the similarity is low), the character image of interest is more likely to be erroneously recognized as another character with a similar shape. Hence, the recognition result in step S907 is not adopted, the character image is handled in the same manner as a line image, and the outline of the character image is vector-converted (S911). In other words, for the character image which has high probability of a recognition error, visually faithful outline vector data is generated.

On the other hand, if the similarity is high, the recognition result in step S907 is adopted, and font information is output together with a character code, thus recognizing a character font (S909). Note that a plurality of feature dictionaries as many as character types used in character recognition are prepared in correspondence with character shape types, i.e., font types, thus attaining font recognition. Subsequently, each character is converted into vector data with reference to the character code and font information obtained by the character recognition and font recognition using outline data prepared in advance in correspondence with the character code and font information (S910). In case of color image data, a character color is extracted and is recorded together with vector data.

With the above processing, character images included in the segment of the text attribute can be converted into vector data which have approximately faithful shapes, sizes, and colors.

[Vector Conversion Other than Text Region]

For a segment other than that of the text attribute, i.e., that which is determined as the picture, line, or table attribute, black pixel clusters are extracted, and their outlines are converted into vector data. Note that a segment of the photo attribute remains unchanged as image data without vector conversion.

Figure 7:
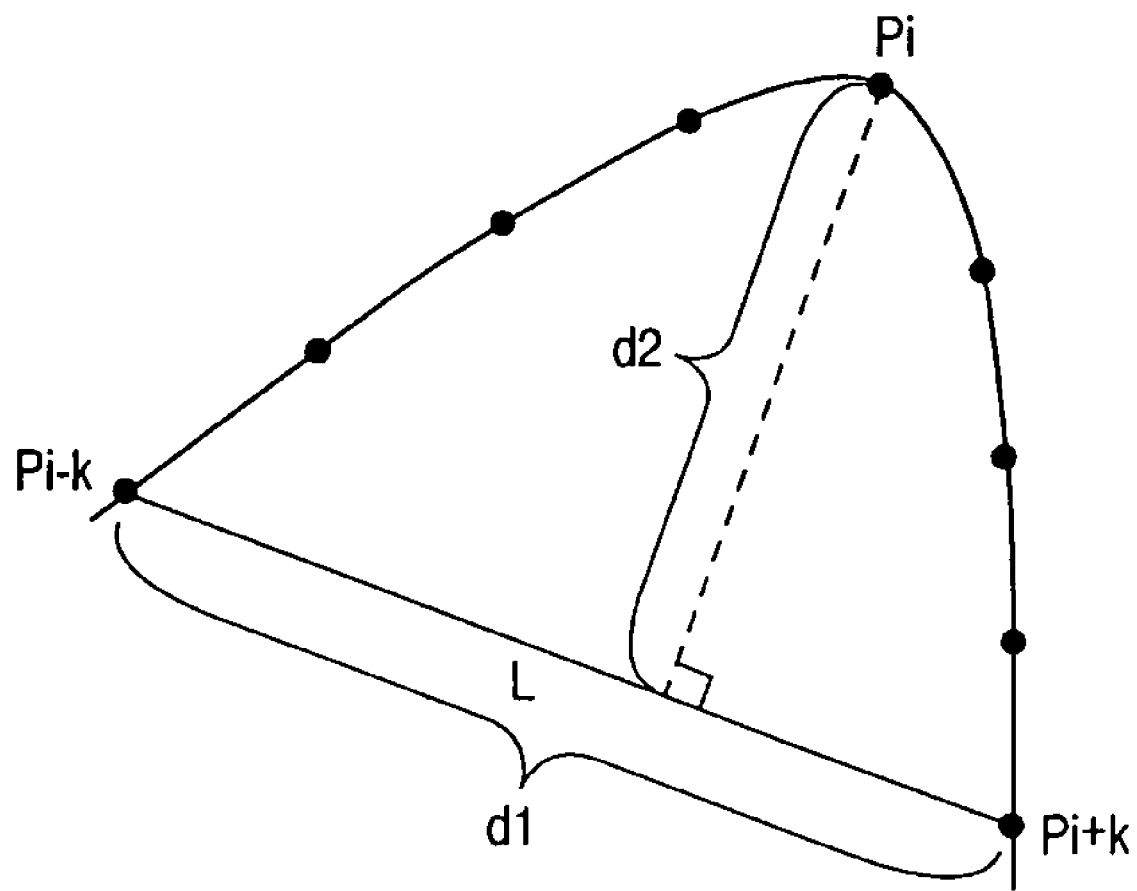
FIG. 7 is a view for explaining corner extraction processing in vector conversion.

Vector conversion of a region other than the text region detects a "corner" which segments a curve into a plurality of sections (pixel arrays), so as to express a line image or the like as a combination of straight lines and/or curves. FIG. 7 is a view for explaining corner extraction processing in vector conversion. A corner is a point which corresponds to a maximal curvature, and whether or not a pixel Pi on a curve shown in FIG. 7 is a corner is determined as follows:

The pixel Pi is defined as a starting point, and pixels Pi−k and Pi+k which are separated from the pixel Pi by the predetermined number k of pixels in two directions along the line image curve are connected by a line segment L. Let d1 be the distance between the pixels Pi−k and Pi+k, and d2 be the length (the distance between the pixel Pi and line segment L) of a line segment dropped from the pixel Pi to the line segment L to cross at right angles. If d2 becomes maximal, or if a ratio d1/A of a length A of an arc between the pixels Pi−k and Pi+k and the distance d1 becomes equal to or smaller than a predetermined threshold, the pixel Pi is determined as a corner.

After the corner is detected, pixel arrays of the line image curve segmented by the corner are approximated by straight lines or curves. Approximation to a straight line is executed by a method of least squares or the like, and that to a curve uses a ternary spline function or the like. The pixel of the corner that segments pixel arrays becomes the start or terminal end of the approximated straight line or curve.

Furthermore, it is checked if an inside outline of a white pixel cluster exists within the vector-converted outline. If such inside outline exists, that outline is vector-converted, and inside outlines of the black and white pixel clusters are recursively vector-converted, taking an inside outline in each inside outline.

As described above, using the method of approximating partial lines of an outline by straight lines or curves, the outline of a picture with an arbitrary shape can be vector-converted. When an input image is a color image, the color of a picture is extracted from the color image, and is recorded together with vector data.

Figure 8:
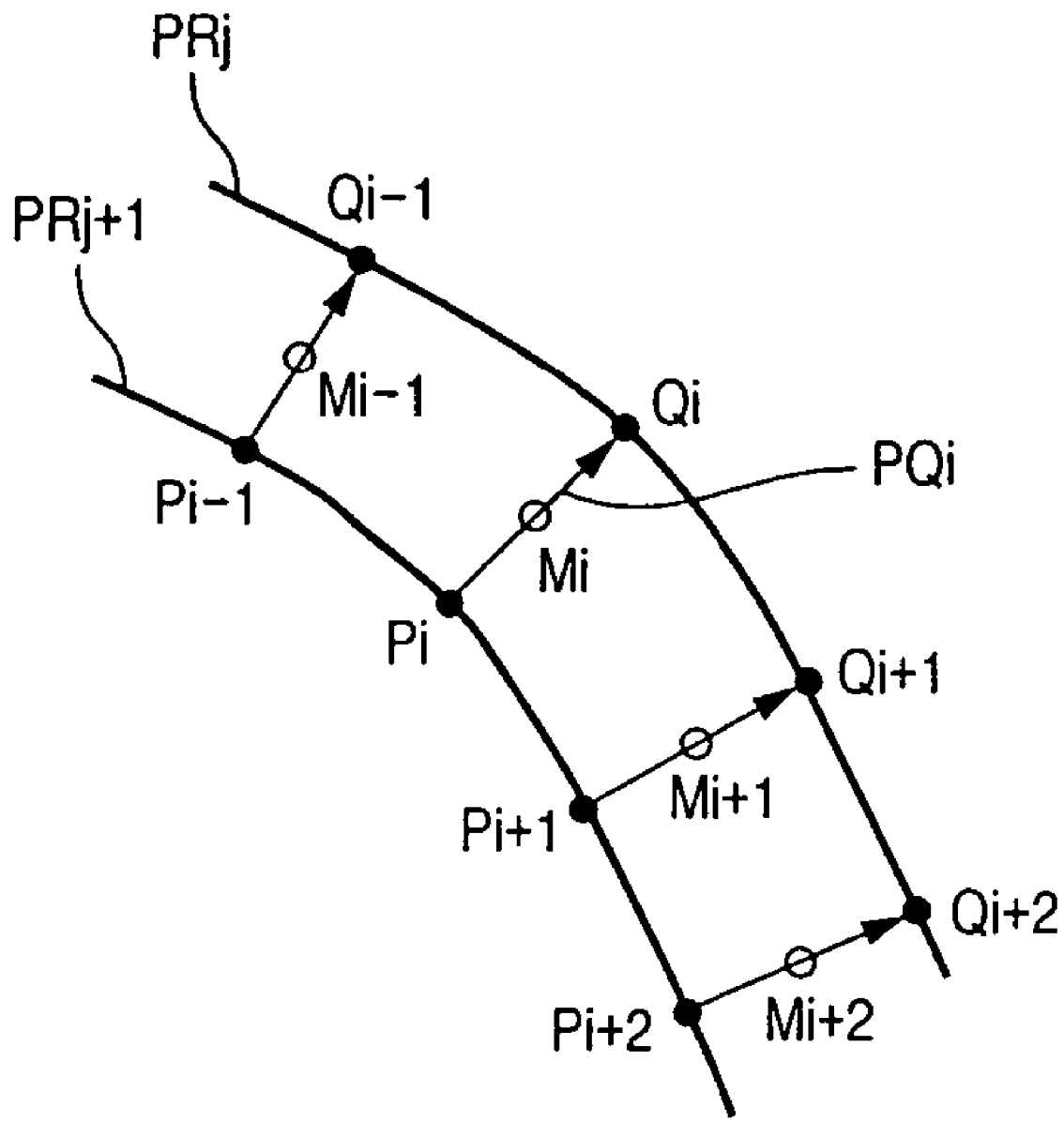
FIG. 8 is a view for explaining processing for grouping outlines in vector conversion.

FIG. 8 is a view for explaining processing for grouping outlines in vector conversion.

When an outside outline PRj is close to an inside outline PRj+1 or another outside outline within a section of interest of outlines, two or three or more outlines are combined to express a line having a given width. For example, distances PQi between pixels Pi on the outline PRj+1 and pixels Qi on the outline PRj which have shortest distances from the pixels Pi are calculated. When variations of the distances PQi between a plurality of pixels are slight, the section of interest of the outlines PRj and PRj+1 is approximated by a straight line or curve along a point sequence of middle points Mi of line segments PQi. The width of the approximated straight line or curve along the point sequence of the middle points Mi can be set to be the average value of the distances PQi.

A line or a table ruled line as a set of lines can be efficiently vector-converted by expressing them as a set of lines having a width.

[Recognition of Picture]

After the outlines of a line picture or the like are vector-converted, vector-converted partial lines are grouped for each picture object.

Figure 9:
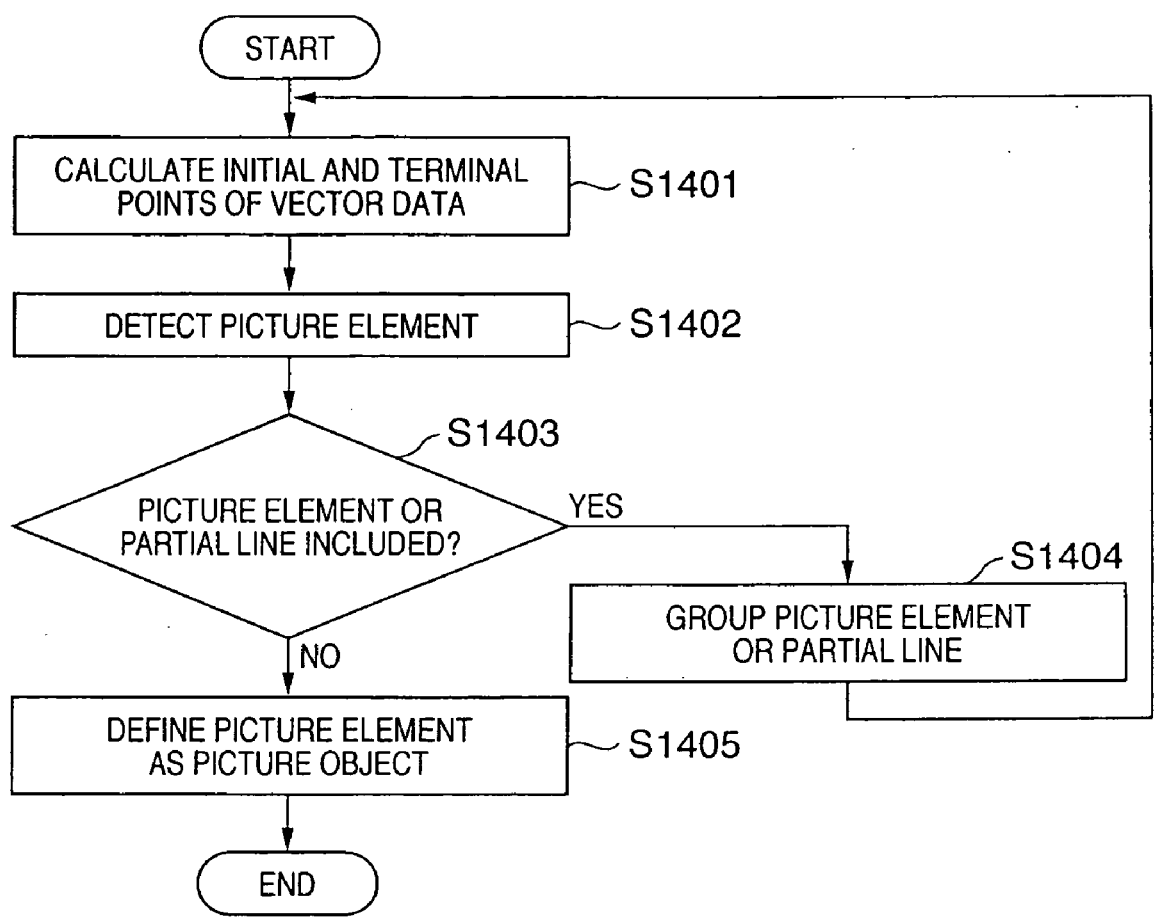
FIG. 9 is a flowchart showing grouping processing of vector data generated by vector conversion.

FIG. 9 is a flowchart showing grouping processing of vector data generated by vector conversion, i.e., processing for grouping vector data for each picture object.

Initial and terminal points of each vector data are calculated (S1401) to detect a picture element using the information of the initial and terminal points (S1402). Note that the picture element is a closed picture formed by partial lines, and vectors are connected at common corner pixels serving as the initial and terminal ends upon detection. That is, a principle that vector groups forming closed shapes have vectors to be connected at their two ends is applied.

Next, it is checked if another picture element or partial line exists in the picture element (S1403). If such picture element or partial line exists, steps S1401 and S1402 are recursively repeated. Then, these elements or lines are grouped to form a picture object (S1404). If no other picture element or partial line exists in the picture element, that picture element is defined as one picture object (S1405).

Note that FIG. 9 shows processing for only one picture object. If another picture object exists, the processing in FIG. 9 is repeated accordingly.

Detection of Picture Element (S1402)

FIG. 10 is a flowchart showing the detection processing of picture elements.

Vectors which do not have any vectors, two ends of which are not coupled to other vectors, are excluded from vector data to extract vectors which form a closed picture (S1501).

As for the vectors which form the closed picture, one end point (initial or terminal point) of a vector of interest is set as a start point, and vectors are searched in a predetermined direction (e.g., clockwise). That is, the end point of the other vector is searched for at the other end point, and the closest end point within a predetermined distance is defined as an end point of a vector to be connected. When all the vectors which form the closed picture are traced once until the start point is reached, all the passed vectors are grouped as a closed picture which form one picture element (S1502). Also, all vectors which form a closed picture present in the closed picture are recursively grouped. Furthermore, the initial point of a non-grouped vector is set as a start point to repeat the same processing.

Of the excluded vectors, a vector (a vector to be connected to the closed picture) whose end point is close to the vectors grouped as the closed picture is detected, and the detected vector is grouped into that group (S1503).

With the aforementioned processing, picture data included in a segment of the picture attribute can be converted into reusable vector data which has a nearly faithful shape, size, and color. Note that a segment of the photo attribute remains unchanged as photo data without vector conversion.

Modification of Embodiment

In the description of the above example, a document image is vector-converted for respective objects of regions, schema information is generated based on the object ID and layout information, and the generated schema information is registered in the job archive server 106. Furthermore, it may be checked if schema information that matches the generated schema information is registered in the job archive server 106. If matching schema information is detected, a schema ID added to that schema information may be acquired. If no matching schema information is detected, a unique schema ID may be generated, the acquired or generated schema ID is added to the schema information to be registered, and history information may be registered in the job archive server 106. In this way, the output history of an image can be traced.

In this manner, according to the image processing system of this embodiment, it is checked if an object corresponding to an object of each segment is stored in the image storage server 105. If such object is stored, the object ID of that object is acquired. If no such object is stored, the object added with a unique object ID is registered in the image storage server 105. Schema information is generated using the acquired or generated object ID, and is registered in the job storage server 106 as history information together with job attribute information.

Since the image processing system shown in FIG. 1 provides reusable data as vector data or image data, different jobs are more likely to use identical objects. Therefore, an object used in the previous job is more likely to be included in the current job. Since such object is registered in the image storage server 105, the already registered object can be prevented from being redundantly registered by checking if the object included in the current job is registered in the image storage server 105.

Therefore, according to the embodiment, all input and output image data need not be stored in the storage device, thus improving the storage efficiency. Of course, even in image data in which some characters or images have been changed by editing a previously copied document image, the changed object must be registered in the image storage server 105 by adding an object ID. However, as for an object which is not changed, its object ID need only be acquired, but the object itself need not be registered in the image storage server 105. That is, objects can be prevented from being redundantly registered in the image storage server 105, and the storage efficiency of the image storage server 105 that registers objects can be improved.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-056214, filed on Mar. 1, 2005, which is hereby incorporated by reference herein in its entirety.

What is claimed is:

1. An image processing apparatus for receiving an image and executing a job for the image, comprising:

a segmenting section, arranged to segment the input image into image regions having different attributes;

a first detector, arranged to detect a corresponding image from a first memory by search for an image of each of the segmented image regions, and to acquire, when the corresponding image is detected, an object ID of the detected image;

a storing section, arranged to store the image of the image region, the corresponding image of which is not detected, in the first memory by adding a unique object ID to the image;

a generator, arranged to generate schema information which includes location information of the image regions and the object IDs of the images of the image regions, and indicates a layout of the input image; and a registering section, arranged to register history information including at least the schema information in a second memory.

2. The apparatus according to claim 1, further comprising:

a second detector, arranged to detect schema information corresponding to the schema information generated by said generator from the second memory by search, and to acquire, when the corresponding schema information is detected, a schema ID of the detected schema information; and an adding section, arranged to add a unique schema ID to the schema information, the corresponding schema information of which is not detected.

3. The apparatus according to claim 1, further comprising a converter, arranged to convert the image of the region into vector data.

4. The apparatus according to claim 1, wherein the history information includes at least an execution date and time of the job, user information, a type of the job, a number used to identify said image processing apparatus, and a result of the job in addition to the schema information.

5. The apparatus according to claim 1, further comprising a storage to which the first memory and the second memory are assigned.

6. The apparatus according to claim 1, further comprising a communication section, arranged to communicate with an external apparatus via a computer network, wherein the first memory and the second memory respectively correspond to different server apparatuses.

7. An image processing method of an image processing apparatus which receives an image and executes a job for the image, the method comprising steps of:

segmenting the input image into image regions having different attributes;

detecting a corresponding image from a memory by search for an image of each of the image regions, and acquiring, when the corresponding image is detected, an object ID of the detected image;

storing the image of the image region, the corresponding image of which is not detected, in the memory by adding a unique object ID to the image;

generating schema information which includes location information of the image regions and the object IDs of the images of the image regions, and indicates a layout of the input image; and registering history information including at least the schema information in the memory.

8. A computer-readable storage medium storing a computer-executable program for causing a computer to execute an image processing method of an image processing apparatus which receives an image and executes a job for the image, the method comprising steps of:

segmenting the input image into image regions having different attributes;

detecting a corresponding image from a memory by search for an image of each of the image regions, and acquiring, when the corresponding image is detected, an object ID of the detected image;

storing the image of the image region, the corresponding image of which is not detected, in the memory by adding a unique object ID to the image;

generating schema information which includes location information of the image regions and the object IDs of the images of the image regions, and indicates a layout of the input image; and registering history information including at least the schema information in the memory.

9. An image processing apparatus for receiving an image and executing a job for the image, comprising:

a segmenting section, arranged to segment the input image into image regions having different attributes;

a detector, arranged to detect an image of the segmented image region from a first memory by search;

a storing section, arranged to store no image of the image region, which is found by said detector, in the first memory, and to store the image of the image region, which is not found by said detector, in the first memory by adding a unique object ID to the image;

a generator, arranged to generate specifying information which includes location information of the image, which is stored in the first memory, in the input image, and ID information of the stored image; and a registering section, arranged to register the specifying information in a second memory.

10. The apparatus according to claim 9, wherein said storing section registers ID information of the image of the image regions, which is found by said detector, in the second memory as the specifying information.

* * * * *